(12) United States Patent
Esteban et al.

(10) Patent No.: US 10,066,301 B2
(45) Date of Patent: Sep. 4, 2018

(54) METHOD OF COATING THE SURFACE OF A METAL SUBSTRATE

(71) Applicants: MESSIER-BUGATTI-DOWTY, Velizy Villacoublay (FR); RBNANO, Strasbourg (FR)

(72) Inventors: Julien Esteban, Strasbourg (FR); Rodrigue Roland Mafouana, Strasbourg (FR); Jean-Luc Rehspringer, Lingolsheim (FR)

(73) Assignees: MESSIER-BUGATTI-DOWTY, Vélizy-Villacoublay (FR); RBNANO, Strasbourg (FR)

( * ) Notice: Subject to any disclaimer, the term of this patent is extended or adjusted under 35 U.S.C. 154(b) by 0 days.

(21) Appl. No.: 14/879,242

(22) Filed: Oct. 9, 2015

(65) Prior Publication Data

US 2016/0102406 A1 Apr. 14, 2016

(30) Foreign Application Priority Data

Oct. 10, 2014 (FR) ...................................... 14 59762

(51) Int. Cl.
*B05D 7/00* (2006.01)
*C23C 22/78* (2006.01)
(Continued)

(52) U.S. Cl.
CPC ............ *C23C 22/78* (2013.01); *C09D 5/1675* (2013.01); *C23C 18/122* (2013.01);
(Continued)

(58) Field of Classification Search
CPC ..................................................... C23C 22/78
(Continued)

(56) References Cited

U.S. PATENT DOCUMENTS 6,605,365 B1 * 8/2003 Krienke ................ B05D 3/102
428/328

FOREIGN PATENT DOCUMENTS

DE 10 2011 078 066 A1 12/2012
GB 2 499 847 9/2013

OTHER PUBLICATIONS

Milea, The influence of parameters in silica sol-gel process, Bulletin of the Transilvania University of Brasov, Series I: Engineering Sciences, vol. 4 (53), No. 1-2011.*

(Continued)

*Primary Examiner* — Tabatha Penny
(74) *Attorney, Agent, or Firm* — Oblon, McClelland, Maier & Neustadt, L.L.P.

(57) ABSTRACT

A method of coating the surface of a metal substrate includes a) applying a first composition on the surface of a metal substrate, the first composition being a solution comprising a liquid medium including sol-gel precursors of alcoxysilane type or of metallo-organic type; b) subjecting the first composition to first heat treatment to form an anchor layer on the metal substrate in which the sol-gel precursors are bonded to the metal substrate, a first temperature being imposed during the first heat treatment that is sufficient to eliminate all or part of the liquid medium and to encourage the bonding of the sol-gel precursors to the metal substrate; and c) applying a second composition on the anchor layer. The second composition includes coating compounds to obtain a coating on the anchor layer by forming bonds between the sol-gel precursors and the coating compounds.

9 Claims, 4 Drawing Sheets

(51) Int. Cl.
*C09D 5/16* (2006.01)
*C23C 18/12* (2006.01)
(52) U.S. Cl.
CPC ...... *C23C 18/1216* (2013.01); *C23C 18/1225* (2013.01); *C23C 18/1241* (2013.01); *C23C 18/1254* (2013.01); *C23C 18/1283* (2013.01)
(58) Field of Classification Search
USPC .................................................. 427/419.1
See application file for complete search history.

(56) References Cited

OTHER PUBLICATIONS

Schneller, Carboxylate Based Precursor Systems, Chemical Solution Deposition of Functional Oxide Thin Films, Jan. 1, 2013, p. 29-49; Cited in the IDS of Oct. 9, 2015.*
French Preliminary Search Report dated Jun. 16, 2015 in French Application 14 59762, filed on Oct. 10, 2014 ( with English Translation of Categories of Cited Documents).
Theodor Schneller et al. "Carboxylate Based Precursor Systems", Chemical Solution Deposition of Functional Oxide Thin Films, 2013, 22 pages.

* cited by examiner

METHOD OF COATING THE SURFACE OF A METAL SUBSTRATE

BACKGROUND OF THE INVENTION

The invention relates to methods of coating the surfaces of metal substrates.

It is known to perform chemical or mechanical pre-treatments prior to performing certain surface treatments on metal substrates. Such pre-treatments may serve to provide good cohesion between the substrate and the material deposited during surface treatment, the deposited material being constituted by way of example by a layer of paint, of varnish, or by a layer that is formed by the sol-gel technique. Pre-treatments can also impart good reactivity to the elements present on the surface of the substrate for the purpose of performing chemical or electrochemical treatments (e.g. chemical conversion, anode oxidation, or static chemical deposition).

FIG. 1 shows examples of pre-treatments known in the state of the art. Nevertheless, those pre-treatments can be relatively lengthy to implement and can make known methods of coating metal substrates relatively complex.

Consequently, there exists a need to obtain methods of coating metal substrates that are simple and inexpensive to implement, while making it possible to ensure very good adhesion of the coating that is formed on the underlying substrate.

OBJECT AND SUMMARY OF THE INVENTION

To this end, and in a first aspect, the invention provides a method of coating the surface of a metal substrate, the method comprising the following steps:

a) applying a first composition on the surface of a metal substrate, the first composition comprising a liquid medium including sol-gel precursors of alcoxysilane type and/or of metallo-organic type, said sol-gel precursors being suitable for bonding with the metal substrate;

b) subjecting the first composition to first heat treatment so as to form an anchor layer on the metal substrate in which the sol-gel precursors are bonded to the metal substrate, a first temperature being imposed during the first heat treatment that is sufficient to eliminate all or part of the liquid medium and to encourage the bonding of the sol-gel precursors to the metal substrate, the heat treatment being configured to avoid complete condensation among the sol-gel precursors; and c) applying a second composition on the anchor layer, the second composition including coating compounds so as to obtain a coating on the anchor layer by forming bonds between the sol-gel precursors and the coating compounds.

The sol-gel precursors applied during step a) may have the same chemical nature. In a variant, they may have different chemical natures (i.e. it is possible to apply a mixture of different sol-gel precursors).

The compounds of the coating applied during step c) may have the same chemical nature. In a variant, they may have different chemical natures (i.e. a mixture of different coating compounds may be applied).

In an implementation, the metal substrate comprises aluminum.

The substrate treated during step a) may optionally present an oxidation layer at its surface. Thus, in an implementation, the sol-gel precursors may be applied during step a) onto the oxidation layer of the substrate. In a variant, the metal substrate is not oxidized on the surface and the sol-gel precursors are then applied during step a) onto the metal substrate in the non-oxidized state.

The first heat treatment performed during step b) enables all or part of the liquid medium to be evaporated, thereby making it possible to further improve the bonding of the sol-gel precursors to the metal substrate in order to improve the adhesion of the anchor layer to said substrate. The bonds between the sol-gel precursors present in the anchor layer and the metal substrate may be of any kind, for example they may be covalent bonds, hydrogen bonds, or ionic bonds. In addition, by avoiding complete condensation of the sol-gel precursors, step b) enables the sol-gel precursors to conserve —OH groups (e.g. alcohol or carboxylic acid groups, possibly in alcoholate or carboxylate form) and/or —O-Alk, where Alk designates an alkyl, bound to a silicon atom or a metal atom. As explained below, these groups are useful for bonding sol-gel precursors to coating compounds.

Coating compounds include one or more chemical functions (referred to as fixing functions) suitable for forming a bond with the residual —OH and/or —O-Alk groups of the sol-gel precursors. By way of example, these fixing functions may be selected from —OH and/or —O-Alk' group, where Alk' designates an alkyl different from or identical to the group Alk, e.g. bound to a silicon atom or a metal atom or a carbon chain that may include one or more polymerizable functions such as epoxy or acrylate functions, or taken from alkyl halogenide groups, e.g. alkyl chlorides.

Step c) serves to obtain an interaction between the residual —OH and/or —O-Alk groups of sol-gel precursors anchored to the metal substrate and the fixing functions, e.g. —OH and/or —O-Alk' groups of coating compounds, thereby obtaining good adhesion of the coating to the anchor layer, and consequently to the metal substrate. In particular, this interaction may advantageously result in covalent bonds being formed between the compounds of the coating and the sol-gel precursors. The interaction between the —OH and/or —O-Alk groups of the sol-gel precursors and the fixing functions of the coating compounds may also result in other types of bond being formed, such as for example: hydrogen bonds and/or ionic bonds.

The invention advantageously makes it possible in simple, fast, and inexpensive manner to functionalize the surface of a metal substrate by means of the anchor layer, and to obtain a coating deposited on the anchor layer that presents very good adhesion to the metal substrate. The invention advantageously makes it possible to avoid the steps shown in FIG. 1 that are performed between pre-degreasing and the treatment that seeks to impart its final properties to the substrate. The invention thus makes available a method in which the step of pre-treating the metal substrate (forming the anchor layer) is particularly simple to perform. In particular, the method may advantageously be such that no step of pickling the surface of the metal substrate is performed prior to step a).

It may be advantageous to use one or the other of the sol-gel precursor types (alcoxysilane or metallo-organic) depending on the composition of the metal substrate being treated. For example, if the metal substrate comprises aluminum coated in an oxidation layer on its surface, it is preferable to use sol-gel precursors of the alcoxysilane type, e.g. including an amine type organic ligand group (see below). When the metal of the metal substrate is not coated in an oxidation layer, it may be preferable to use sol-gel precursors of metallo-organic type.

In the invention, and unless mentioned to the contrary, the terms "sol-gel precursors of alcoxysilane type" and "sol-gel precursors of metallo-organic type" designate the forms of those precursors that are not hydrolyzed or that are at least partially hydrolyzed. The invention covers simultaneously circumstances in which the sol-gel precursors are applied during step a) on the metal substrate in non-hydrolyzed form, in partially hydrolyzed form, and in completely hydrolyzed form.

In an implementation, the sol-gel precursors may include sol-gel precursors of alcoxysilane type.

When they are in the non-hydrolyzed state and in the monomer state, sol-gel precursors of alcoxysilane type present the following general formula:

$$A_mSi(OR)_nX_{4-n-m}$$

where:
- R is an alkyl group, and when there are a plurality of groups R, each group R is an alkyl group, which groups R may be identical or different;
- A is a ligand organic function suitable for forming a bond with the metal substrate, the ligand organic function may preferably include a ligand group A' selected from the following groups: alcoxyl; amine; acryloxy; methacryloxy; dimethyl prosphate; diethyl phosphate; epoxy; or vinyl; and when there are a plurality of functions A, each group A' may be as defined above, and the groups A' may be identical or different, the ligand groups A' possibly being bound to silicon by means of alkyl group R';
- X is a group bound to silicon, X may be of any kind, e.g. an atom of hydrogen, a hydrocarbon chain having 1 to 30 carbon atoms, which may be saturated or unsaturated, possibly interrupted by one or more heteroatoms, substituted or non-substituted, or a halogen atom, and when there are a plurality of groups X, the groups X may be identical or different;
- n is an integer in the range 1 to 3; and
- m is an integer in the range 1 to 3.

When the precursors of alcoxysilane type are in at least partially hydrolyzed form, it must be understood that some or all of the alcoxyl groups bound to silicon (the above —OR groups) of said precursors are hydrolyzed in order to form silanol (Si—OH) groups. When the precursor of alcoxysilane type are in completely hydrolyzed form, it must be understood that all of the alcoxyl groups bound to the silicon of said precursors are hydrolyzed in order to form silanol groups.

In addition, during step a), the sol-gel precursors of alcoxysilane type may be in the monomer or the oligomer state. The oligomer state corresponds to a state in which silicon atoms are bonded by at least one oxo-(—Si—O—Si—) bridge obtained as a result of a condensation reaction. Under such circumstances, the precursors present —Si—O—Si— motifs. When the precursors are in the oligomer state, condensation is sufficiently limited for the precursors not to precipitate and for them, after step b), still to conserve residual —OH and/or —O-Alk groups, as explained above.

The ligand organic function of precursors of alcoxysilane type interacts with the metal substrate in order to provide good anchoring of the anchor layer to the metal substrate.

In an implementation, each sol-gel precursor of alcoxysilane type may have at least one ligand organic function suitable for bonding to the metal substrate, the ligand organic function possibly including at least one of the following ligand groups: alcoxyl; amine; acryloxy; methacryloxy; dimethyl prosphate; diethyl phosphate; epoxy; and vinyl; and preferably amine; acryloxy; and methacryloxy.

The choice of sol-gel precursors of alcoxysilane type, each including a ligand group of amine, acryloxy, or methacryloxy type can be particularly advantageous when the metal substrate comprises aluminum.

In an implementation, the sol-gel precursors applied during step a) may be selected from the following compounds:
(methacryloxymethyl)methyldimethoxysilane (CAS 121177-93-3);
(methacryloxymethyl)methyldiethoxysilane (CAS 3978-58-3);
(methacryloxymethyl)dimethylmethoxysilane (CAS 130771-16-3);
diethylphosphatoethylmethyldiethoxysilane (CAS 18048-06-1);
3-aminopropyltriethoxysilane (CAS 919-30-2);
methacryloxypropyltriisopropoxysilane (CAS 80750-05-6);
m-aminophenyltrimethoxysilane (CAS 70411-42-6);
methacryloxypropyltriethoxysilane (CAS 21142-29-0);
N-(2-aminoethyl)-3-aminopropyltrimethoxysilane;
3-methacryloxypropyltrimethoxysilane (CAS 2530-85-0);
acetoxypropyltrimethoxysilane (CAS 59004-18-1);
p-aminophenyltrimethoxysilane (CAS 33976-43-1);
3-(acryloxypropyl)trimethoxysilane (CAS 4369-14-6);
diethylphosphatoethyltriethoxysilane (CAS 757-44-8);
3-mercaptopropyltriethoxysilane (CAS 14814-09-6);
3-aminopropylmethyldiethoxysilane (CAS 3179-76-8);
3-mercaptopropyltrimethoxysilane (CAS 4420-74-0);
carboxyethylsilanetriol in sodium salt form (CAS 18191-40-7);
3-mercaptopropylmethyldimethoxysilane (CAS 31001-77-1);
4-aminobutyltriethoxysilane (CAS 3069-30-5); and mixtures thereof.

Preferably, the sol-gel precursors of alcoxysilane type may include methacryloxypropyltrimethoxysilane (MAPTMS) and/or (3-aminopropyl)-triethoxysilane (APTES).

In an implementation, all of the applied sol-gel precursors may be MAPTMS. In a variant, all of the applied sol-gel precursors may be APTES.

In an implementation, the sol-gel precursors may include sol-gel precursors of metallo-organic type.

When the metallo-organic type sol-gel precursors are in the non-hydrolyzed state and in the monomer state, they present the following general formula:

$$Me(OOCR'')_nX'_{m'}$$

where:
- Me is a metal selected from columns 2 to 13 of the periodic table, Me is preferably iron;
- R'' is an alkyl group, and when there are a plurality of groups R'', each group R'' is an alkyl group and the groups R'' may be identical or different, CR'' may be a carbon chain comprising 1 to 5 carbon atoms and preferably comprising at least 3 carbon atoms;
- X' is a group bound to the metal Me, X' may be of any kind, e.g. it may be a halogen, a nitrate group of formula —NO$_3$, a ligand organic function, e.g. an acetyl acetonate group or an amine group, an organic acid group of formula —OOCR''' different from the group(s) of formula —OOCR'', CR''' designating a carbon chain comprising 1 to 30 carbon atoms, which may be saturated or unsaturated, and when there are a plurality of groups X', the groups X' may be identical or different; and m' and n' are integers, n' is greater than or equal to 1, m' is greater than or equal to 0, and the sum m'+n' is equal to the valence of the metal Me.

When the metallo-organic precursors are in an at least partially hydrolyzed form, it should be understood that all or part of the —OOCR" groups bound to the metal of said precursors are replaced by —OH groups bound to the metal. When the metallo-organic precursors are in completely hydrolyzed form, it should be understood that all of the —OOCR" groups bound to the metal of said precursors are replaced by —OH groups bound to the metal.

In addition, during step a), the sol-gel precursors of metallo-organic type may be in the monomer state, i.e. in a non-polymerized state. Under such circumstances, they do not have a -Me-O-Me- motif. It is possible for the sol-gel precursors of metallo-organic type that are applied to be grouped together in nodules, as can happen if said precursors present long carbon chains that can group together for reasons of lipophilic affinity in order to form precursor nodules of a few molecules.

The sol-gel precursors of metallo-organic type may preferably include iron. Preferably, the sol-gel precursors of metallo-organic type include iron propionate. In a variant, the sol-gel precursors of metallo-organic type may include other metals, such as chromium, nickel, cobalt, copper, or zinc.

In an implementation, all of the sol-gel precursors that are applied may be iron propionate.

In an implementation, the sol-gel precursors applied during step a) may be in an at least partially hydrolyzed form. In a variant, the sol-gel precursors may be applied in a non-hydrolyzed form during step a).

It may be advantageous to apply the sol-gel precursors in an at least partially hydrolyzed form during step a) insofar as the —OH groups bound to the silicon or to the metal of said precursors can interact very easily (without applying any heat or while applying limited heat) with the fixing functions of the coating compounds, and can very easily enable bonds to be formed between the coating compounds and the sol-gel precursors.

Preferably, prior to step c), the coating compounds and/or the sol-gel precursors may include —OH groups.

Such a configuration advantageously leads to facilitating interaction between the coating compounds and the sol-gel precursors.

In an implementation, the coating compounds may be selected from the following compounds:

(methacryloxymethyl)methyldimethoxysilane (CAS 121177-93-3);

(methacryloxymethyl)methyldiethoxysilane (CAS 3978-58-3);

(methacryloxymethyl)dimethylmethoxysilane (CAS 130771-16-3);

diethylphosphatoethylmethyldiethoxysilane (CAS 18048-06-1);

3-aminopropyltriethoxysilane (CAS 919-30-2);

methacryloxypropyltriisopropoxysilane (CAS 80750-05-6);

m-aminophenyltrimethoxysilane (CAS 70411-42-6);

3-(acryloxypropyl)tris(trimethylsiloxy)silane (CAS 17096-12-7);

methacryloxypropyltriethoxysilane (CAS 21142-29-0);

N-(2-aminoethyl)-3-aminopropyltrimethoxysilane;

2-(acryloxyethoxy)trimethylsilane (CAS 18269-99-3);

3-methacryloxypropyltrimethoxysilane (CAS 2530-85-0);

acetoxypropyltrimethoxysilane (CAS 59004-18-1);

p-aminophenyltrimethoxysilane (CAS 33976-43-1);

3-(acryloxypropyl)trimethoxysilane (CAS 4369-14-6);

diethylphosphatoethyltriethoxysilane (CAS 757-44-8);

3-(acryloxypropyl)trichlorosilane (CAS 38595-89-0);

3-mercaptopropyltriethoxysilane (CAS 14814-09-6);

3-(acryloxypropyl)methyldichlorosilane (CAS 71550-63-5);

3-aminopropylmethyldiethoxysilane (CAS 3179-76-8);

3-mercaptopropyltrimethoxysilane (CAS 4420-74-0);

carboxyethylsilanetriol in sodium salt form (CAS 18191-40-7);

3-mercaptopropylmethyldimethoxysilane (CAS 31001-77-1);

4-aminobutyltriethoxysilane (CAS 3069-30-5);

methacryloxyethoxytrimethylsilane (CAS 17407-09-9); and mixtures thereof.

When they are applied on the anchor layer, the coating compounds may be formulated in a liquid medium selected from: 1-propanol; n-propanol; 2-butanol; n-butanol; amlyl alcohols; esters of such alcohols; and mixtures thereof.

In an implementation, the second heat treatment may be performed after applying the second composition on the anchor layer.

The second heat treatment may be performed at a temperature that is high enough to encourage bonds to form between the sol-gel precursors and the coating compounds. Thus, performing such second heat treatment is advantageous, in particular when the coating compounds and/or the sol-gel precursors include —O-Alk or —O-Alk' groups in order to enhance the formation of covalent bonds between the compounds of the coating and the sol-gel precursors of the anchor layer. Nevertheless, when the compounds of the coating and the sol-gel precursors include numerous —OH functions, it is possible to obtain good adhesion of the coating to the anchor layer at ambient temperature without performing such second heat treatment. It is then not necessary to perform the second heat treatment. In order to obtain good adhesion between the coating and the anchor layer, it may suffice to allow sufficient time for the coating compounds and the sol-gel precursors to bond together at ambient temperature (20° C.)

As an alternative or in combination, performing the second heat treatment may advantageously make it possible to improve the hardness of the anchor layer and/or of the coating. Under such circumstances, the second heat treatment is performed at a temperature that is high enough to condense the sol-gel precursors of the anchor layer among one another and/or the coating compounds among one another. Under such circumstances, the compounds of the coating may be sol-gel precursors, e.g. based on at least partially hydrolyzed epoxy-silanes, and the second heat treatment may serve to condense these coating compounds among one another.

Thus, in an implementation, the sol-gel precursors of the anchor layer and the coating compounds may bond together at ambient temperature, and then the second heat treatment may be performed so as to condense the sol-gel precursors among one another and/or the coating compounds among one another, assuming that they still have condensable groups (—OH and/or —O-Alk and/or —O-Alk') in order to form —Si—O—Si— and/or -Me-O-Me- motifs.

In a variant, the second heat treatment may be performed after applying the second composition on the anchor layer in order both to encourage the formation of bonds between the sol-gel precursors and the coating compounds, and to condense the sol-gel precursors among one another and/or the coating compounds among one another.

In an implementation, prior to step a), the method may also include a step a') of treating the surface of the metal substrate, such as air or oxygen plasma treatment. This step enables the metal surface to be completely degreased, enables any organic residues that may have come from a protective blister pack to be eliminated, and enables any residues of protective grease or lubricants that may have become embedded in grooves as a result of passes of cutter or shaping tools to be eliminated.

In an implementation, the resulting coating may constitute a layer of paint. In an implementation, the coating may be obtained by a sol-gel method when the coating compounds constitutes sol-gel precursors.

DETAILED DESCRIPTION OF IMPLEMENTATIONS

Figure 1:
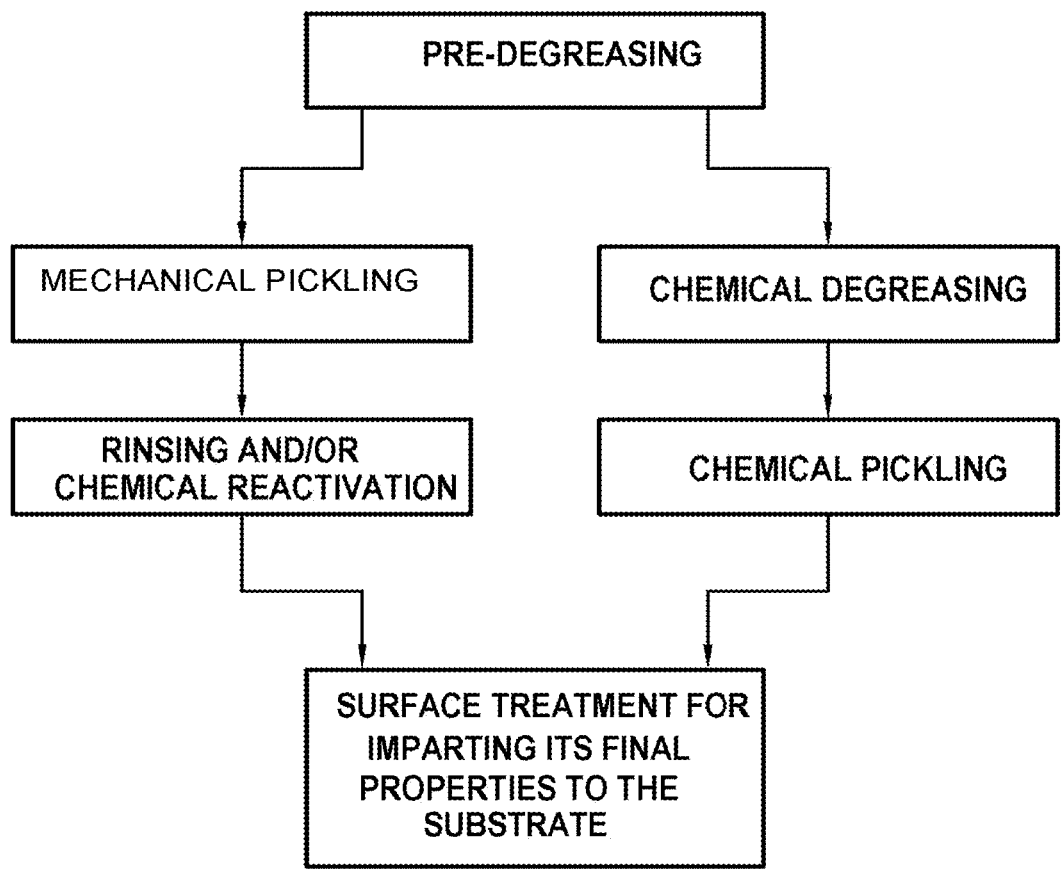
FIG. 1 shows a succession of prior art steps for treating the surface of a metal substrate.
Figure 2:
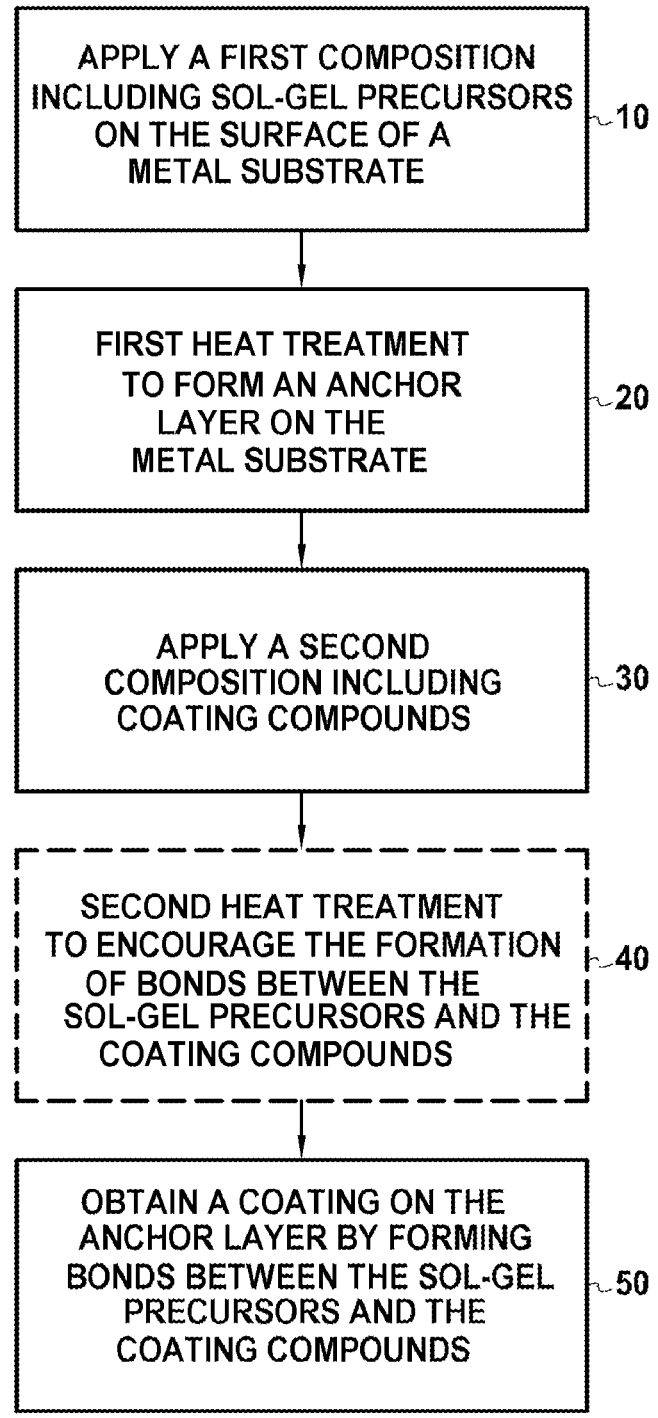
FIG. 2 is a block diagram showing the succession of steps in an implementation of the method of the invention.

FIG. 2 is a block diagram showing a succession of steps that can be performed in the context of the present invention. The steps in dashed-line boxes are optional.

Initially, a first liquid composition is applied to the surface of a substrate, e.g. comprising aluminum (step 10). By way of example, the treated substrate may comprise an aluminum alloy, e.g. an alloy of aluminum and copper (2000 series aluminum alloy) or an alloy of aluminum and zinc (7000 series aluminum alloy). In a variant, the substrate comprises a steel.

In an implementation, the treated substrate may be an anodized aluminum alloy, e.g. for use in a braking application in the field of aviation. The substrate may thus be for making a wheel or for making means to apply pressing force, such as a hydraulic ring. More generally, the treated substrate may be for constituting a casing or a primary part of an airframe.

As mentioned above, the first composition includes sol-gel precursors of alcoxysilane type and/or sol-gel precursors of metallo-organic type. The first composition may advantageously include a single sol-gel precursor of alcoxysilane or metallo-organic type that is designed not to be completely condensed following step b).

When the first composition includes sol-gel precursors of alcoxysilane type, the solvent may for example be an alcohol. In particular, when APTES is used, the solvent may include ethanol, and when MAPTMS is used, the solvent may include iso-propanol.

More generally, the sol-gel precursors of alcoxysilane type may be dissolved in a light solvent such as ethanol, iso-propanol, n-propanol, 1-butanol, 2-butanol, 2-methyl-2-propanol, acetic acid, propionic acid, butanoic acid, ethyl acetate, propyl acetate, and mixtures thereof. Sol-gel precursors of alcoxysilane type may be dissolved in a polar solvent other than water presenting high vapor pressure, greater than or equal to 4 millibars at 20° C., e.g. lying in the range 4 millibars to 30 millibars at 20° C. As explained above, when they are applied to the surface of the metal substrate, the sol-gel precursors of alcoxysilane type may be in a form that is at least partially hydrolyzed, e.g. as a result of adding acid water.

The sol-gel precursors of alcoxysilane type may be present in the first composition at a concentration by weight greater than or equal to 4 grams per liter (g/L), e.g. greater than or equal to 20 g/L. By way of example, the sol-gel precursors of alcoxysilane type may be present in the first composition at a concentration by weight lying in the range 4 g/L to 40 g/L, for example.

The sol-gel precursors of metallo-organic type may be dissolved in a light solvent such as ethanol, iso-propanol, n-propanol, 1-butanol, 2-butanol, 2-methyl-2-propanol, acetic acid, propionic acid, butanoic acid, ethyl acetate, propyl acetate, and mixtures thereof. In general manner, the sol-gel precursors of metallo-organic type may be dissolved in a polar solvent other than water presenting a vapor pressure that is high, being greater than or equal to 4 millibars at 20° C., e.g. lying in the range 4 millibars to 30 millibars at 20° C.

The sol-gel precursors of metallo-organic type may be present in the first composition at a concentration by weight greater than or equal to 3 g/L, e.g. greater than or equal to 14 g/L. By way of example, the sol-gel precursors of metallo-organic type may be present in the first composition at a concentration by weight lying in the range 3 g/L to 30 g/L, for example.

During step a), the first composition may be applied using any known means, e.g. spraying, dipping the metal substrate in a bath including the first composition, or by means of an applicator such as a rag, or a brush. In an implementation, the surface of the metal substrate is not subjected to any pickling step prior to applying the first composition. Independently of the nature of the sol-gel precursors used, it is possible during step a) to apply a weight of sol-gel precursors per unit area of the metal substrate lying in the range 0.4 grams per square meter ($g/m^2$) to 4 $g/m^2$, e.g. in the range 0.4 $g/m^2$ to 2 $g/m^2$.

Once the first composition has been deposited on the metal substrate, a first heat treatment is performed so as to form an anchor layer on the metal substrate (step 20). During the first heat treatment, a first temperature is used that is sufficient to eliminate all or part of the liquid medium from the first composition and to enhance bonding of the sol-gel precursors to the metal substrate. The first temperature and the duration for which it is applied are selected so as to avoid complete condensation of the sol-gel precursors among one another.

Independently of the nature of the sol-gel precursors used, the first temperature used during step b) may, by way of example, be greater than or equal to 80° C., e.g. greater than or equal to 100° C. The first temperature used during step b) may, by way of example, be less than or equal to 180° C. The first temperature used during step b) may, by way of example, lie in the range 80° C. to 180° C., e.g. in the range 100° C. to 180° C.

The duration for which the first temperature is applied during step b) may be less than or equal to 30 minutes (min). More precisely, for sol-gel precursors of alcoxysilane type, the duration for which the first temperature is applied during step b) may, by way of example, lie in the range 2 min to 10 min. For sol-gel precursors of metallo-organic type, the duration for which the first temperature is applied during step b) may, by way of example, lie in the range 10 min to 30 min.

After step b) and before step c), it is possible to cool the anchor layer that forms, e.g. returning it to ambient temperature (20° C.)

After performing step 20, a second composition is applied on the anchor layer (step 30). The second composition includes coating compounds suitable for obtaining a coating on the anchor layer by bonding together the sol-gel precursors and the coating compounds, as explained above, i.e. forming bonds between them. In an implementation, the coating compounds may be sol-gel precursors, the coating being to be obtained by a sol-gel technique.

The coating compounds may be present in the second composition at a concentration greater than or equal to 0.1 moles per liter (mol/L), e.g. lying in the range 0.1 mol/L to 1 mol/L.

Once the coating compounds have been applied, it is possible, by way of example, to perform second heat treatment at a temperature that is high enough to encourage the formation of bonds between the sol-gel precursors and the coating compounds (step 40). By way of example, the second temperature used during the second heat treatment may be greater than or equal to 80° C., e.g. greater than or equal to 100° C. By way of example, the second temperature may lie in the range 80° C. to 180°, e.g. in the range 100° C. to 180° C. The second temperature may be used for a duration of at least 15 min, e.g. at least one hour.

As an alternative, or in combination, the second heat treatment may serve to condense the sol-gel precursors among one another and/or to condense the coating compounds among one another, as explained above.

Once step 30, and optionally step 40, have/has been performed, a coating is obtained on the anchor layer by bonds being formed between the sol-gel precursors and the coating compounds (step 50).

Step c) may be performed directly after step b) (i.e. without any other treatment being performed between steps b) and c)).

The coating obtained after step c) may constitute a layer of paint. The coating obtained after step c) may be obtained by a sol-gel technique when the coating compounds are sol-gel precursors.

There follows a description of FIGS. 3A to 3D, which show the changes that occur when performing the various steps of the method. In these figures, the dimensions of the various layers are not to scale, for reasons of clarity.

Figure 3A:
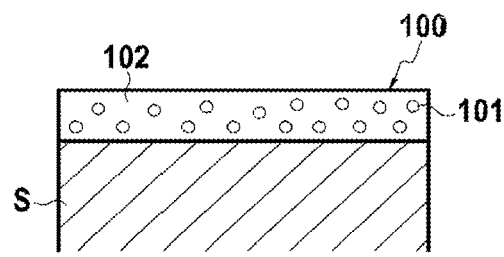
FIGS. 3A to 3D are highly diagrammatic and fragmentary views showing the changes that occur when performing the various steps of a method of the invention.
Figure 3B:
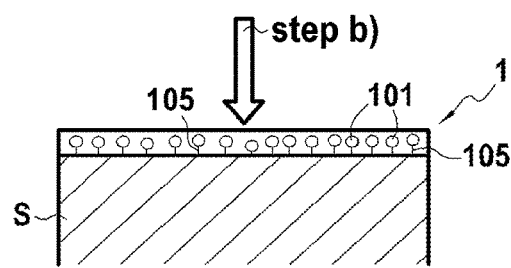
Figure 3C:
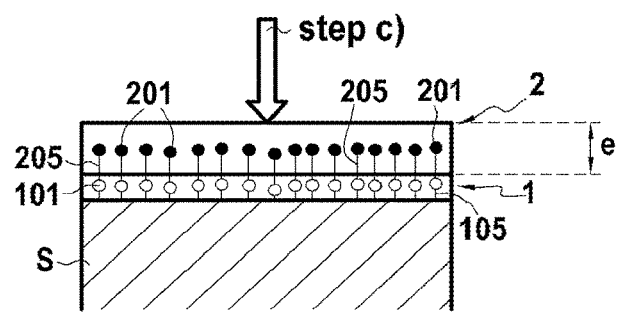
Figure 3D:
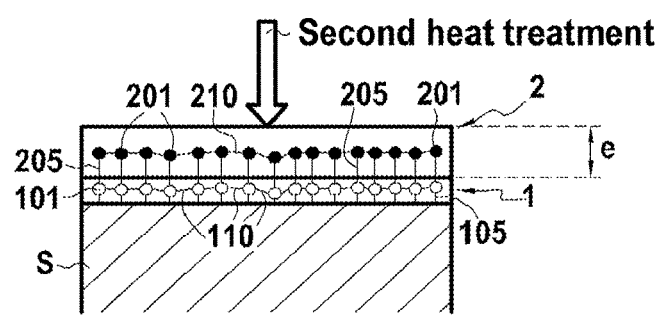

FIG. 3A shows the result obtained after performing step a) of the invention. As shown, a first composition 100 in the form of a solution having the sol-gel precursors 101 present therein is applied onto the metal substrate S. The sol-gel precursors 101 are present in a solvent 102 that may be as described above. After step b), the solvent 102 has been eliminated by evaporation so as to form an anchor layer 1 in contact with the metal substrate. The sol-gel precursors 101 present in the anchor layer 1 have developed bonds 105 with the metal substrate S (see FIG. 3B). As shown in FIG. 3B, the sol-gel precursors 101 present in the anchor layer after performing step b) are not condensed among one another (no bonding between the sol-gel precursors 101). It would not go beyond the ambit of the present invention if there were to be partial condensation among the sol-gel precursors 101 after step b), providing the precursors 101 retain —OH groups and/or —O-Alk groups suitable for interacting with the coating compounds so as to form bonds therewith.

Figure 4:
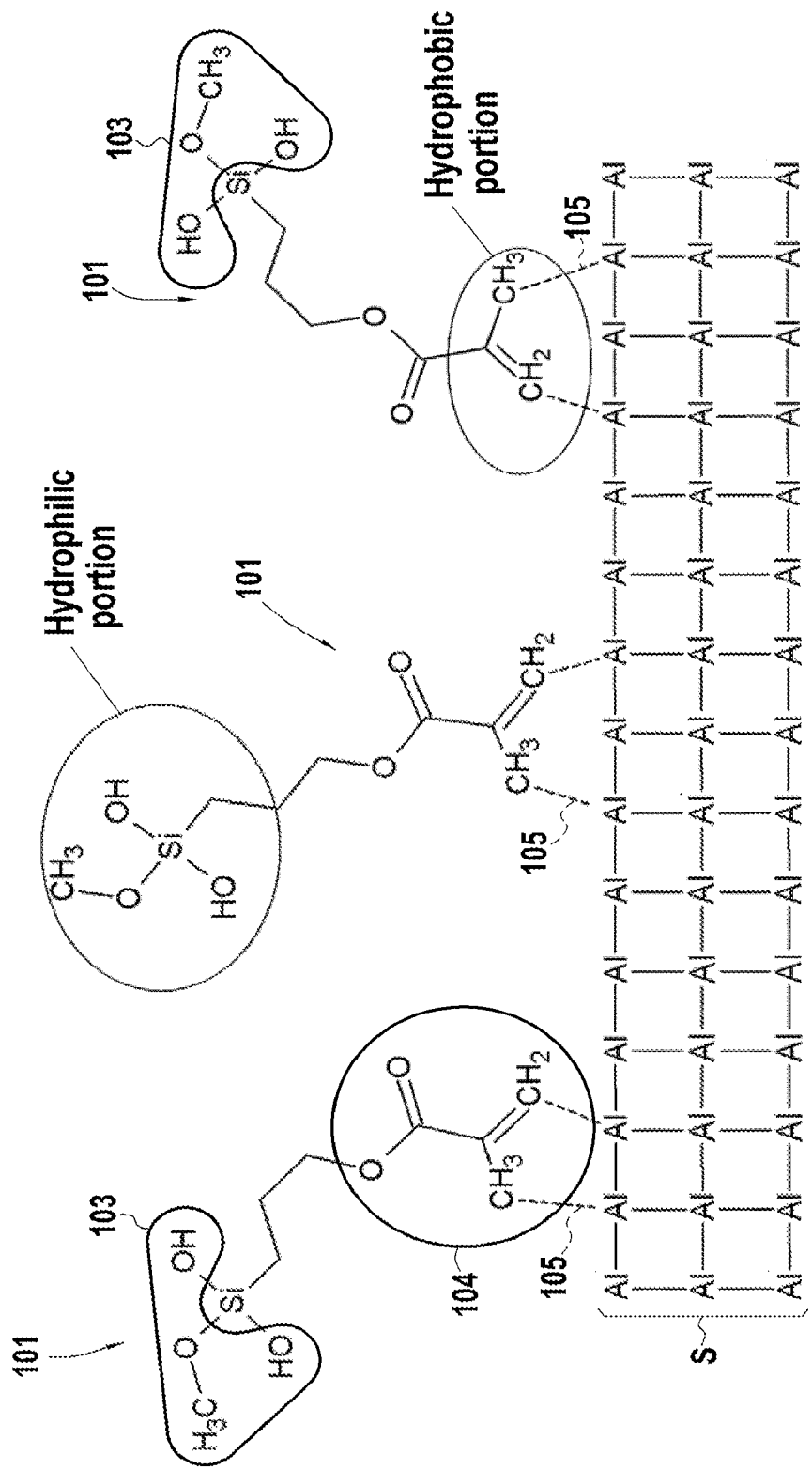
FIG. 4 shows the bonding of sol-gel precursors of the anchor layer to the underlying metal substrate.

FIG. 4 shows the sol-gel precursors 101 fixing to the metal substrate S. In the example shown in FIG. 4, the metal substrate S is an aluminum substrate of surface that has been pickled (the substrate does not present a layer of oxidation at its surface), and the sol-gel precursors 101 that are applied to the surface of the substrate S are MAPTMS. As shown, the sol-gel precursors 101 form a bond 105 with the substrate S. This bond 105 is provided by a ligand group 104, in this example of methacryloxy type, which group forms a portion of the ligand organic function of the sol-gel precursors 101. The ligand group 104 constitutes a hydrophobic portion that tends to arrange itself beside the surface of the substrate S which also constitutes a hydrophobic region.

Furthermore, the MAPTMS sol-gel precursors 101 in the example shown have been applied to the substrate S in partially hydrolyzed form. It is advantageous to apply the sol-gel precursors 101 in a form that is at least partially hydrolyzed so that they present hydrophilic portions that tend to point away from the surface of the substrate S. Thus, the residual —OH and —OCH, groups 103 tend in the majority to point away from the substrate S, thereby serving to improve interactions with the coating compounds that are applied subsequently, and consequently improving the adhesion of the coating to the anchor layer.

Naturally, in a variant, the MAPTMS precursors could be applied in totally hydrolyzed form. During step b) there could still be partial condensation among the sol-gel precursors within the anchor layer.

Thereafter, a second composition is applied on the anchor layer 1. This second composition includes coating compounds 201. In the example shown, the coating compounds 201 and the sol-gel precursors 101 have sufficient —OH groups to ensure that bonds 205 form at ambient temperature between the sol-gel precursors 101 and the coating compounds 201 in order to ensure that the coating 2 adheres to the anchor layer 1 (see FIG. 3C).

In an implementation, the thickness e of the coating 2 that is formed during step c) may be greater than or equal to 500 nanometers (nm), and is preferably greater than or equal to 1 micrometer (μm). The thickness e corresponds to the greatest dimension of the coating 2 measured perpendicularly to the surface of the substrate S.

It is then possible to perform second heat treatment so as to condense the sol-gel precursors 101 among each other and condense the coating compounds 201 among each other. Bonds 110 are thus created between the sol-gel precursors 101, and bonds 210 are created between the coating compounds 201 (see FIG. 3D). Such treatment serves advantageously to increase the hardness of the coating 2 and possibly of the anchor layer 1.

EXAMPLES

Example 1

Applying a First Composition Including Sol-Gel Precursors of Alcoxysilane Type

In this example, two types of substrate were coated in accordance with the invention, namely: a polished substrate of 304 type stainless steel, and a mirror-polished substrate of aluminum.

Prior to applying the first composition, the surface of the metal substrate was initially cleaned. By way of example, the cleaning may be performed by degreasing with acetone, rinsing in ethanol, and then in water, followed by drying in compressed air, or using a degreasing solution sold by the supplier Ceetal under the name Major Font NM at 5% in water in an ultrasound vessel. It is also possible to perform washing with deionized water, followed by drying using an air jet.

Thereafter, the metal substrate was coated in a first composition including MAPTMS (3-methacryloxypropyltrimethylsilane) sol-gel precursors in solution in iso-propanol. The concentration of MAPTMS sol-gel precursors in the first composition laid in the range 2.48 g/L to 12.4 g/L. The first composition was sprayed on the metal substrate.

After applying the first composition on the metal substrate, the solvent was evaporated by placing the substrate coated in the first composition in a stove that was maintained at a temperature of 100° C. for a duration lying in the range 2 min to 10 min. Thereafter, the substrate was extracted from the stove and returned to ambient temperature.

An epoxy type coating was then formed on the resulting anchor layer.

After the coating had been formed, the coated substrate was put into an oven that was maintained at a temperature of 150° C. for a duration of one hour in order to increase the hardness of the anchor layer and of the coating layer (condensation of condensable species present in these layers).

Table 1 below summarizes the results obtained.

TABLE 1

Results obtained by applying MAPTMS

| Samples | Scotch test | Pencil hardness | Coating thickness | Cross-cut test | Sclerometer hardness |
|---|---|---|---|---|---|
| Polished 304 type stainless steel | Not torn off | Not scratched by H | 10.7 μm | Class 1 (ISO2409) | Not scratched by 5N |
| Mirror polished aluminum | Not torn off | Not scratched by 2H | 12.3 μm | Class 1 (ISO2409) | Not scratched by 4N |

The "Scotch test" serves to determine the adhesion of the coating to the underlying metal substrate. The pencil hardness test, the cross-cut test, and the sclerometer hardness serve to determine the hardness of the coating and of the anchor layer.

The results given in Table 1 show that the method of the invention is particularly simple and makes it possible to obtain coatings that present excellent adhesion to a substrate and also very good hardness.

Example 2

Applying a First Composition Including Sol-Gel Precursors of Alcoxysilane Type

In this example, the treated metal substrate was a 2000 series aluminum alloy.

Prior to applying the first composition, the surface of the metal substrate may initially be cleaned as described in Example 1.

Thereafter, the metal substrate was then coated in a first composition including APTES ((3-aminopropyl)-triehoxysilane) sol-gel precursors in solution in ethanol. The concentration of APTES sol-gel precursors in the first composition was 5 g/L. The solution was applied by spray gun and the thickness of the resulting film was about 2 μm.

After applying the first composition on the metal substrate, the solvent was evaporated by placing the substrate coated in the first composition in a stove maintained at a temperature of 120° C. for a duration lying in the range 2 min to 10 min. The substrate was then extracted from the stove and returned to ambient temperature. An epoxy type coating was then formed on the resulting anchor layer.

After the coating had been formed, the coating substrate was put into a stove maintained at a temperature of 120° C. for a duration of one hour in order to increase the hardness of the anchor layer and of the coating (condensation of condensable species present in these layers).

Table 2 below summarizes the results obtained.

TABLE 2

Results obtained by applying APTES

| Samples | Scotch test | Pencil hardness | Coating thickness | Cross-cut test | Sclerometer hardness |
|---|---|---|---|---|---|
| MB aviation aluminum | Not torn off | Not scratched by 5H | 4 μm | Class 1 (ISO2409) | Not scratched by 4N |

The results given in Table 2 show that the method of the invention is particularly simple and makes it possible to obtain coatings that present excellent adhesion to a substrate and that also present very good hardness.

Example 3

Applying a First Composition Including Sol-Gel Precursors of Metallo-Organic Type In this example, two types of substrate were coated in accordance with the invention, namely: a polished 304 type stainless steel substrate and a mirror polished aluminum substrate.

Prior to applying the first composition, the surface of the metal substrate may initially be cleaned as described in Example 1.

Thereafter, the metal substrate was coated in a solution of iron acetate in propionic acid with the iron acetate being at a concentration of 0.05 mol/L$^{-1}$. The iron acetate forms iron propionate in the solution.

After applying the first composition to the metal substrate, the solvent was evaporated by placing the substrate coated in the first composition in a stove maintained at a temperature of 150° C. for a duration lying in the range 10 min to 30 min. The substrate was then extracted from the stove and returned to ambient temperature. An epoxy type coating was then formed on the resulting anchor layer.

After the coating was formed, the coated substrate was put into a stove maintained at a temperature of 150° C. for a duration of one hour in order to increase the hardness of the anchor layer and of the coating (condensation of the condensable species present in these layers).

Table 3 below summarizes the results obtained:

TABLE 3

Results obtained by applying a solution of iron acetate in propionic acid

| Samples | Scotch test | Pencil hardness | Coating thickness | Cross-cut test | Sclerometer hardness |
|---|---|---|---|---|---|
| Polished 304 type stainless steel | Not torn off | Not scratched by 6H | 3.2 μm | Class 0 (ISO2409) | Not scratched by 4H |
| Mirror polished aluminum | Not torn off | Not scratched by F | 4.3 μm | Class 1 (ISO2409) | Not scratched by 5N |

The term "including/containing a" should be understood as "including/containing at least one".

The terms "lying in the range . . . to . . . " or "from . . . to . . . " should be understood as including the limits.

The invention claimed is:

1. A method of coating the surface of a metal substrate, the method comprising:
   a) applying a first composition on the surface of a metal substrate, the first composition being in the form of a solution comprising a liquid medium including sol-gel precursors of metallo-organic type, said sol-gel precursors being suitable for bonding with the metal substrate, wherein the metallo-organic type sol-gel precursors present the following general formula when the sol-gel precursors are in a non-hydrolyzed state and in a monomer state: Me(OOCR")n'X'm', in which
   Me is iron,
   R" is an alkyl group, and when there is a plurality of groups R", each group R" is an alkyl group,
   X' is a group bound to the iron, and
   m' and n' are integers, n' is greater than or equal to 1, m' is greater than or equal to 0, and the sum m'+n' is equal to a valence of the iron, and
   wherein no step of pickling the surface of the metal substrate is performed before step a);
   b) subjecting the first composition to a first heat treatment so as to form an anchor layer on the metal substrate in which the sol-gel precursors are bonded to the metal substrate, a first temperature being imposed during the first heat treatment that is sufficient to eliminate all or part of the liquid medium and to encourage the bonding of the sol-gel precursors to the metal substrate, the first heat treatment being configured to avoid complete condensation among the sol-gel precursors; and
   c) applying a second composition on the anchor layer, the second composition including coating compounds so as to obtain a coating on the anchor layer by forming bonds between the sol-gel precursors and the coating compounds.

2. The method according to claim 1, wherein each of the sol-gel precursors of metallo-organic type has at least one ligand organic function suitable for bonding to the metal substrate, the ligand organic function including at least one of the following ligand groups: alcoxyl; amine; acryloxy; methacryloxy; dimethyl phosphate; diethyl phosphate; epoxy; and vinyl.

3. The method according to claim 2, wherein the sol-gel precursors of metallo-organic type are iron propionate or iron butyrate.

4. The method according to claim 1, wherein the coating compounds are selected from the following compounds:
   (methacryloxymethyl)methyldimethoxysilane;
   (methacryloxymethyl)methyldiethoxysilane;
   (methacryloxymethyl)dimethylmethoxysilane;
   diethylphosphatoethylmethyldiethoxysilane;
   3-aminopropyltriethoxysilane;
   methacryloxypropyltrii sopropoxysilane;
   m-aminophenyltrimethoxysilane;
   3-(acryloxypropyl)tris(trimethylsiloxy)silane;
   methacryloxypropyltriethoxysilane;
   N-(2-aminoethyl)-3-aminopropyltrimethoxysilane;
   2-(acryloxyethoxy)trimethylsilane;
   3-methacryloxypropyltrimethoxysilane;
   acetoxypropyltrimethoxysilane;
   p-aminophenyltrimethoxysilane;
   3-(acryloxypropyl)trimethoxysilane;
   diethylphosphatoethyltriethoxysilane;
   3-(acryloxypropyl)trichlorosilane;
   3-mercaptopropyltriethoxysilane;
   3-(acryloxypropyl)methyldichlorosilane;
   3-aminopropylmethyldiethoxysilane;
   3-mercaptopropyltrimethoxysilane;
   carboxyethylsilanetriol in sodium salt form;
   3-mercaptopropylmethyldimethoxysilane;
   4-aminobutyltriethoxysilane;
   methacryloxyethoxytrimethylsilane and;
   mixtures thereof.

5. The method according to claim 1, wherein at least one of the coating compounds and the sol-gel precursors include —OH groups prior to step c).

6. The method according to claim 1, wherein the sol-gel precursors applied during step a) are in at least partially hydrolyzed form.

7. The method according to claim 1, wherein second heat treatment is performed after applying the second composition on the anchor layer.

8. The method according to claim 1, wherein the metal substrate includes aluminum.

9. The method according to claim 1, wherein the coating that is obtained constitutes a layer of paint or wherein the coating is obtained by a sol-gel method.

* * * * *